US012663520B2

(12) United States Patent (10) Patent No.: US 12,663,520 B2
Ozaki et al. (45) Date of Patent: Jun. 23, 2026

(54) OBJECT DETECTION APPARATUS AND CONTROL METHOD OF OBJECT DETECTION APPARATUS

(71) Applicant: DENSO CORPORATION, Kariya-city (JP)

(72) Inventors: Noriyuki Ozaki, Kariya-city (JP); Yoshihide Tachino, Kariya-city (JP); Takehiro Hata, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 1049 days.

(21) Appl. No.: 17/806,355

(22) Filed: Jun. 10, 2022

(65) Prior Publication Data

US 2022/0299614 A1 Sep. 22, 2022

Related U.S. Application Data

(63) Continuation of application No. PCT/JP2020/045084, filed on Dec. 3, 2020.

(30) Foreign Application Priority Data

Dec. 13, 2019 (JP) ................................. 2019-224974

(51) Int. Cl.
*G01S 7/48* (2006.01)
*G01S 7/487* (2006.01)
*G01S 17/10* (2020.01)
*G01S 17/894* (2020.01)

(52) U.S. Cl.
CPC ............ *G01S 7/4873* (2013.01); *G01S 17/10* (2013.01); *G01S 17/894* (2020.01)

(58) Field of Classification Search
None
See application file for complete search history.

(56) References Cited

U.S. PATENT DOCUMENTS

2003/0218919 A1* 11/2003 Arita ....................... G01S 17/42
                                                                    365/200
2009/0040502 A1     2/2009 Hashimoto et al.
2018/0045513 A1*    2/2018 Kitamura ................. G01C 3/06
2019/0041503 A1*    2/2019 Shand ..................... G01S 17/42
2019/0195990 A1*    6/2019 Shand ................... G01S 7/4861
                                    (Continued)

FOREIGN PATENT DOCUMENTS

CN         101922918 A     12/2010
CN         108508453 A      9/2018
                                    (Continued)

*Primary Examiner* — Hovhannes Baghdasaryan
(74) *Attorney, Agent, or Firm* — Precision Patents, P.C.

(57) ABSTRACT

An object detection apparatus includes: a light emission part; a light reception part; a time determination part that determines an environmental light acquisition time during which to acquire environmental light in accordance with the intensity of the environmental light; a light reception control part that controls an operation of receiving incident light by the light reception part; and a light emission control part that controls a light emission operation by the light emission part. The light reception control part causes the light reception part to execute a light reception operation by which to acquire the environmental light during the determined environmental light acquisition time.

14 Claims, 7 Drawing Sheets

(56)     References Cited

U.S. PATENT DOCUMENTS

| | | |
|---|---|---|
| 2019/0265356 A1 | 8/2019 | Ueno et al. |
| 2020/0132847 A1* | 4/2020 | Hillard ................. G01S 7/4865 |

FOREIGN PATENT DOCUMENTS

| | | |
|---|---|---|
| CN | 109188452 A | 1/2019 |
| JP | 2003130954 A | 5/2003 |
| JP | 2005238885 A | 9/2005 |
| JP | 2008170323 A | 7/2008 |
| JP | 2010052601 A | 3/2010 |
| JP | 2012060012 A | 3/2012 |
| JP | 2016176750 A | 10/2016 |

* cited by examiner

TIME t [μs]

OBJECT DETECTION APPARATUS AND CONTROL METHOD OF OBJECT DETECTION APPARATUS

CROSS-REFERENCE TO RELATED APPLICATION

This application is the U.S. bypass application of International Application No. PCT/JP2020/045084 filed on Dec. 3, 2020 which designated the U.S. and claims priority to Japanese Patent Application No. 2019-224974 filed on Dec. 13, 2019, the contents of both of which are incorporated herein by reference.

TECHNICAL FIELD

The present disclosure relates to a technique for detecting an object used in a vehicle.

BACKGROUND

There is known a technique for improving the accuracy of ranging by a light detection and ranging (lidar) that is a ranging apparatus measuring a distance to a target object by using laser light, or an object detection apparatus, by taking account of disturbance light, that is, environmental light (for example, JP 2019-144186 A).

SUMMARY

In a first aspect, there is provided an object detection apparatus. The object detection apparatus according to the first aspect includes: a light emission part that emits laser light; a light reception part; a time determination part that determines an environmental light acquisition time during which to acquire environmental light in accordance with intensity of the environmental light; a light reception control part that controls an operation of receiving incident light by the light reception part and causes the light reception part to execute a light reception operation by which to acquire the environmental light during the determined environmental light acquisition time; and a light emission control part that controls a light emission operation by the light emission part.

In a second aspect, there is provided an object detection apparatus. The object detection apparatus according to the second aspect includes: a light emission part that emits laser light; a light reception part; a time determination part that determines a time of light emission for object detection by the light emission part in accordance with a characteristic of detection reflection light that is incident light on the light reception part in response to the light emission for object detection by the light emission part; a light reception control part that controls an operation of receiving the incident light by the light reception part and causes the light reception part to perform a light reception operation by which to acquire environmental light during an environmental light acquisition time determined by the determined light emission time and an object detection time; and a light emission control part that controls a light emission operation by the light emission part and causes the light emission part to perform the light emission operation for object detection during the determined light emission time. The time determination part increases the light emission time and decreases the environmental light acquisition time if an S/N ratio that is the characteristic of the detection reflection light is lower than a predetermined reference value.

In a third aspect, there is provided a control method of an object detection apparatus. The control method of an object detection apparatus according to the third aspect includes: determining an environmental light acquisition time during which to acquire environmental light in accordance with intensity of the environmental light; causing a light reception part to execute a light reception operation by which to acquire the environmental light during the determined environmental light acquisition time; and causing a light emission part emitting laser light to execute a light emission operation for object detection after a lapse of the environmental light acquisition time.

In a fourth aspect, there is provided a control method of an object detection apparatus. The control method of an object detection apparatus according to the fourth aspect includes: determining a time of light emission for object detection by a light emission part emitting laser light in accordance with a characteristic of detection reflection light that is incident light on a light reception part in response to the light emission for object detection by the light emission part; causing the light reception part to perform a light reception operation by which to acquire environmental light during an environmental light acquisition time determined by the determined light emission time and an object detection time; causing the light emission part to perform a light emission operation for object detection during the determined light emission time; and increasing the light emission time and decreasing the environmental light acquisition time if an S/N ratio that is the characteristic of the detection reflection light is lower than a predetermined reference value.

BRIEF DESCRIPTION OF THE DRAWINGS

The above features of the present disclosure will be made clearer by the following detailed description, given referring to the appended drawings. In the accompanying drawings:

FIG. 1 is an explanatory diagram illustrating an example of a vehicle equipped with an object detection apparatus according to a first embodiment;

FIG. 7 is a timing chart illustrating an environment acquisition time and an object detection time in one slot in a case where the intensity of environmental light is lower than the reference value.

DETAILED DESCRIPTION OF THE PREFERRED EMBODIMENTS

Figure 2:
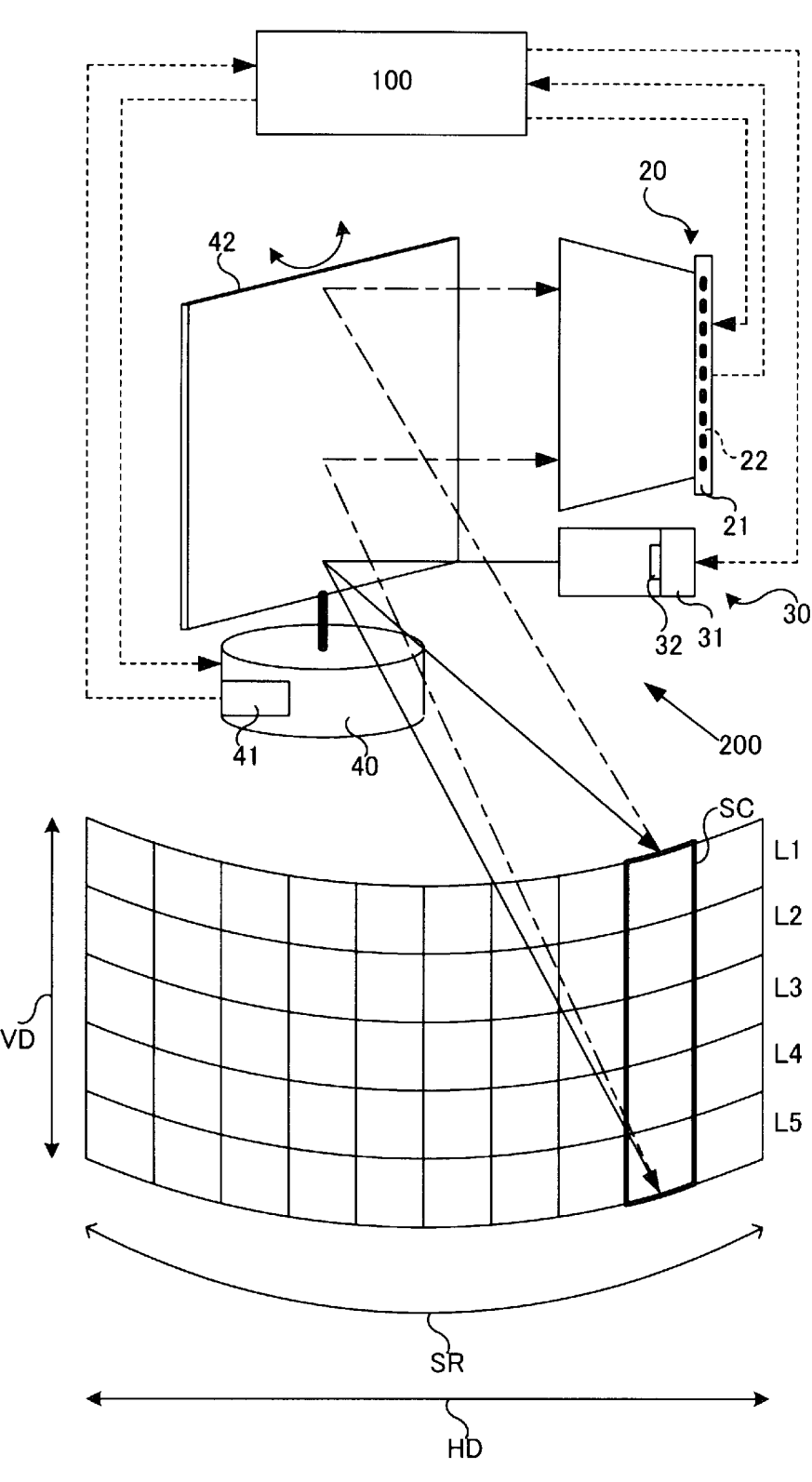
FIG. 2 is an explanatory diagram illustrating a general configuration of a lidar used in the first embodiment.

According to the conventional technique, no consideration is given to the dynamic range of an environmental light image or a background light image obtained by a lidar under environmental light.

Therefore, there is demand for improvement in the dynamic range of an environmental light image obtained by a lidar-type object detection apparatus.

The present disclosure can be carried out in aspects described below.

In a first aspect, there is provided an object detection apparatus. The object detection apparatus according to the first aspect includes: a light emission part that emits laser light; a light reception part; a time determination part that determines an environmental light acquisition time during which to acquire environmental light in accordance with intensity of the environmental light; a light reception control part that controls an operation of receiving incident light by the light reception part and causes the light reception part to execute a light reception operation by which to acquire the environmental light during the determined environmental light acquisition time; and a light emission control part that controls a light emission operation by the light emission part.

According to the object detection apparatus in the first aspect, it is possible to improve the dynamic range of an environmental light image.

In a second aspect, there is provided an object detection apparatus. The object detection apparatus according to the second aspect includes: a light emission part that emits laser light; a light reception part; a time determination part that determines a time of light emission for object detection by the light emission part in accordance with a characteristic of detection reflection light that is incident light on the light reception part in response to the light emission for object detection by the light emission part; a light reception control part that controls an operation of receiving the incident light by the light reception part and causes the light reception part to perform a light reception operation by which to acquire environmental light during an environmental light acquisition time determined by the determined light emission time and an object detection time; and a light emission control part that controls a light emission operation by the light emission part and causes the light emission part to perform the light emission operation for object detection during the determined light emission time. The time determination part increases the light emission time and decreases the environmental light acquisition time if an S/N ratio that is the characteristic of the detection reflection light is lower than a predetermined reference value.

According to the object detection apparatus in the second aspect, it is possible to improve the dynamic range of an environmental light image.

In a third aspect, there is provided a control method of an object detection apparatus. The control method of an object detection apparatus according to the third aspect includes: determining an environmental light acquisition time during which to acquire environmental light in accordance with intensity of the environmental light; causing a light reception part to execute a light reception operation by which to acquire the environmental light during the determined environmental light acquisition time; and causing a light emission part emitting laser light to execute a light emission operation for object detection after a lapse of the environmental light acquisition time.

According to the control method of an object detection apparatus in the third aspect, it is possible to improve the dynamic range of an environmental light image.

In a fourth aspect, there is provided a control method of an object detection apparatus. The control method of an object detection apparatus according to the fourth aspect includes: determining a time of light emission for object detection by a light emission part emitting laser light in accordance with a characteristic of detection reflection light that is incident light on a light reception part in response to the light emission for object detection by the light emission part; causing the light reception part to perform a light reception operation by which to acquire environmental light during an environmental light acquisition time determined by the determined light emission time and an object detection time; causing the light emission part to perform a light emission operation for object detection during the determined light emission time; and increasing the light emission time and decreasing the environmental light acquisition time if an S/N ratio that is the characteristic of the detection reflection light is lower than a predetermined reference value.

According to the control method of an object detection apparatus in the fourth aspect, it is possible to improve the dynamic range of an environmental light image. The present disclosure can also be carried out as a control program of the object detection apparatus or as a computer-readable recording medium that records the program.

An object detection apparatus and a control method of the object detection apparatus will be described below based on some embodiments.

First Embodiment

Figure 1:
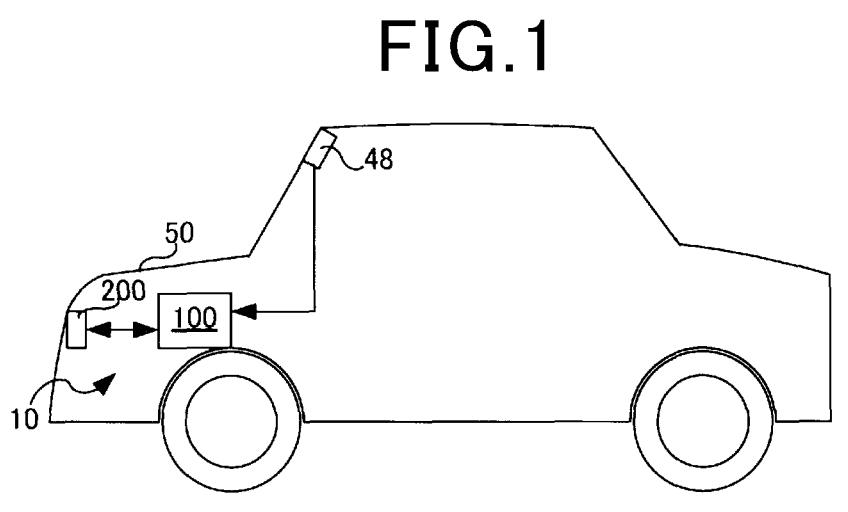

As illustrated in FIG. 1, an object detection apparatus 10 according to a first embodiment is mounted and used in a vehicle 50. The object detection apparatus 10 includes a light detection and ranging (lidar) 200 and a control device 100 that controls operations of the lidar 200. The object detection apparatus 10 is also called a ranging apparatus and is capable of detecting a distance to a target object by using the lidar 200, and detecting the position and characteristics of the target object. The vehicle 50 may also include an illumination sensor 48 for detecting environmental light, a wheel speed sensor, a yaw rate sensor, and a driving assistance control apparatus for providing driving assistance.

As illustrated in FIG. 2, the object detection apparatus 10 includes the lidar 200 that is a light determination part to output detection light by light emission and receive incident detection reflection light or environmental light, and the control device 100 that controls a light emission operation and a light reception operation by the lidar 200. The lidar 200 and the control device 100 may be physically stored in a single housing or in separate housings. The lidar 200 includes a light reception part 20, a light emission part 30, an electric motor 40, a rotation angle sensor 41, and a scanning mirror 42. In the present embodiment, light incident on the light reception part 20 in response to light emission for object detection by the light emission part 30 will be called detection reflection light. The lidar 200 has a predetermined scanning angle range SR in a horizontal direction HD. The scanning angle range SR is divided into a plurality of unit scanning angles SC. At each unit scanning angle SC, the light emission part 30 emits the detection light and the light reception part 20 receives the detection reflection light, whereby detection reflection points are acquired in the entire scanning angle range SR to implement ranging. The unit scanning angle SC determines the resolving power of the lidar 200 in the horizontal direction HD or the resolution of the ranging result obtained by the lidar 200. As the unit scanning angle is smaller, that is, as the number of detection reflection points is greater, the resolving power or the resolution becomes higher. The acquisition of the detection points by the lidar 200 at each unit scanning angle SC, that is, the light emission and light reception processes are executed when one-way scanning is performed in the scanning angle range SR or two-way scanning is performed in the scanning angle range SR. The scanning angle range SR can be segmented into a plurality of lines in a vertical direction VD in accordance with the configuration of the light receiving elements in the light reception part 20 and the light reception process by the light reception part 20. In the example of FIG. 2, the scanning angle range SR is divided into five lines L1 to L5.

Figure 3:
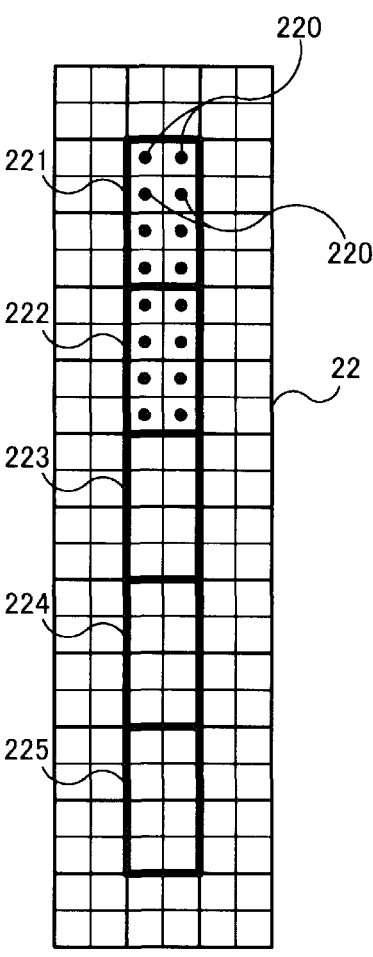
FIG. 3 is an explanatory diagram schematically illustrating a light receiving element array used in the first embodiment.

The light reception part 20 includes a light reception control part 21, a light receiving element array 22, and a light receiving lens not illustrated. The light reception part 20 executes a light reception process by which to output a detection signal indicating a detection point upon receipt of detection reflection light corresponding to the detection light emitted from the light emission part 30. The light reception part 20 also executes a light reception process by which to output environmental light image data or background light image data upon receipt of incident environmental light that does not correspond to reflection from the light emission part 30. The environmental light includes surrounding light of a surrounding atmosphere resulting from sun light or illumination light, and reflected light and scattered light from surrounding objects irradiated with sun light or illumination light. The intensity of the environmental light is base light intensity at the time of acquisition of detection reflection light, that is, background light intensity. The intensity of the environmental light affects the SN characteristics of the detection reflection light. As illustrated in FIG. 3, the light receiving element array 22 is a flat panel-shaped optical sensor in which a plurality of light receiving elements 220 is arranged in vertical and horizontal directions. For example, the light receiving elements are formed of single photon avalanche diodes (SPADs) or other photodiodes. The term light receiving pixel may be used as the minimum unit of light reception process, that is, the unit of light reception corresponding to the detection point. The unit of light reception refers to either the light receiving element array 220 formed by a single light receiving element or the light receiving element array 221 formed of a plurality of light receiving elements. In the light receiving element array 22, as the light receiving pixels, that is, the light receiving elements constituting the units of light reception decrease in number, the units of light reception, that is, the detection points increase in number. In the present embodiment, for example, the light reception process is executed with the light receiving element array 222 formed of eight light receiving elements 220 as the unit of light reception. In the present embodiment, the light receiving element array 22 includes a first light receiving pixel 221, a second light receiving pixel 222, a third light receiving pixels 223, a fourth light receiving pixel 224, and a fifth light receiving pixel 225 corresponding to the five lines L1 to L5 in the scanning angle range SR from the top as seen in the vertical direction.

In response to the emission of detection light by the light emission part 30, the light reception control part 21 executes a light reception process by which to output an incident light intensity signal in accordance with the amount of incident light or the intensity of incident light, using the light receiving pixels 221 to 225, by the unit scanning angle SC, that is, by lines corresponding to the unit scanning angle SC. Specifically, the light reception control part 21 uses all the light receiving pixels 221 to 225 to obtain an electric current generated by the light receiving elements constituting the light receiving elements 221 to 225 in accordance with the amount of incident light or the voltage converted from the electric current, at each unit scanning angle SC, and outputs the electric current or voltage as an incident light intensity signal to the control device 100. Alternatively, if the light emission part 30 emits light corresponding to the lines in the scanning angle range SR, the light reception control part 21 selects the light receiving pixels 221 to 225 corresponding to the light emission lines and outputs incident light intensity signals to the control device 100. The incident light intensity signals may be output to the control device 100 at each unit scanning angle SC, or upon completion of the scanning in the scanning angle range SR, the incident light intensity signals corresponding to the scanning angle range SR may be output to the control device 100. In other words, the incident light intensity signals corresponding to the total number of photons received by the light receiving elements constituting the light receiving element pixels 221 to 225 are output to the control device 100. In an SPAD, in general, since the amount of incident light obtained by one light receiving element 220 is small, the incident intensity signals from the eight light receiving elements 220 as in the light receiving element array 221 are added up by an adder not illustrated, for improvement of the S/N ratio. The ranging function part executing ranging of detection points by Time Of Flight (TOF) may be integrally provided as a circuit of the light reception control part 21 or may be provided as a program to be executed by the control device 100 as described later.

In the present embodiment, the light reception control part 21 switches between an environmental light acquisition mode and a detection reflection light acquisition mode, in accordance with a light reception mode command signal output from the control device 100. More specifically, if the light reception mode command signal indicates 0, the light reception control part 21 switches to the environmental light acquisition mode to start an environmental light acquisition time T1, and acquires environmental light upon receipt of an environmental light acquisition command output from the control device 100. The light reception control part 21 continuously receives the incident light during the environmental light acquisition time T1. When the light reception mode command signal switches from 0 to 1, that is, when the light reception mode switches from the environmental light acquisition mode to the detection reflection light acquisition mode and the environmental light acquisition time T1 is ended, the light reception control part 21 outputs an incident light intensity signal indicating an environmental light intensity Ei. In a light emission time T2, the light reception control part 21 repeatedly receives the detection reflection light in response to a plurality of detection light emissions by the light emission part 30 and outputs an incident light intensity signal indicating the intensity of detection reflection light, thereby accumulating the plurality of outputs of incident light intensity signals. When the light reception mode is switched from the detection reflection light acquisition mode to the environmental light acquisition mode by the light reception mode command signal, that is, when the light emission time T2 is ended, the light reception control part 21 executes a ranging operation related to the unit scanning angle SC, that is, target lines, and outputs the operation results to the control device 100.

Figure 6:
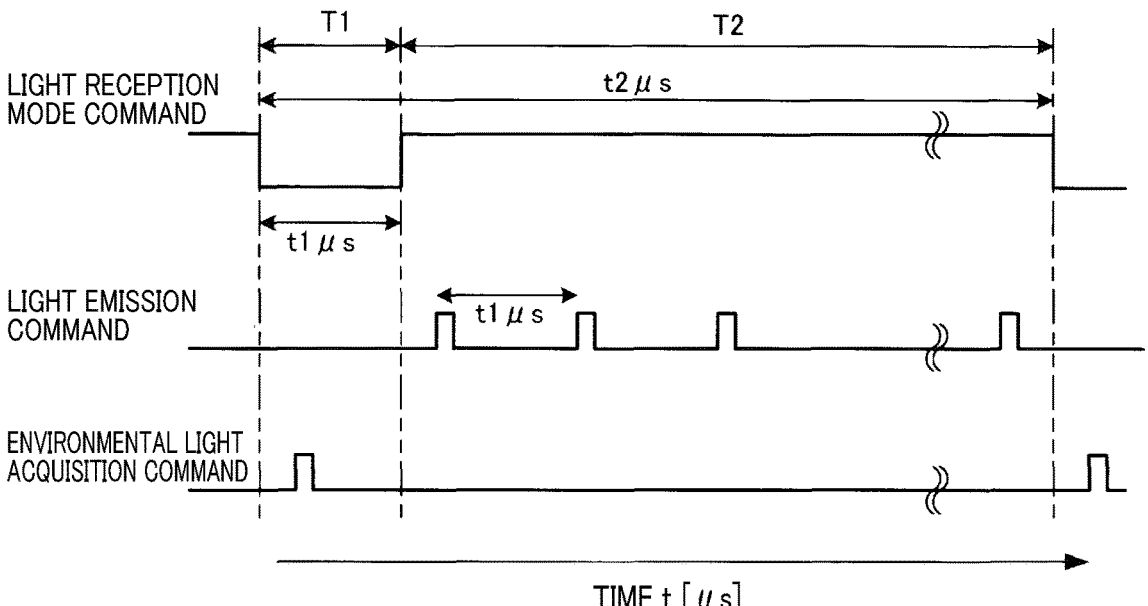
FIG. 6 is a timing chart illustrating an environment acquisition time and an object detection time in one slot in a case where the intensity of environmental light is higher than a reference value.
Figure 7:
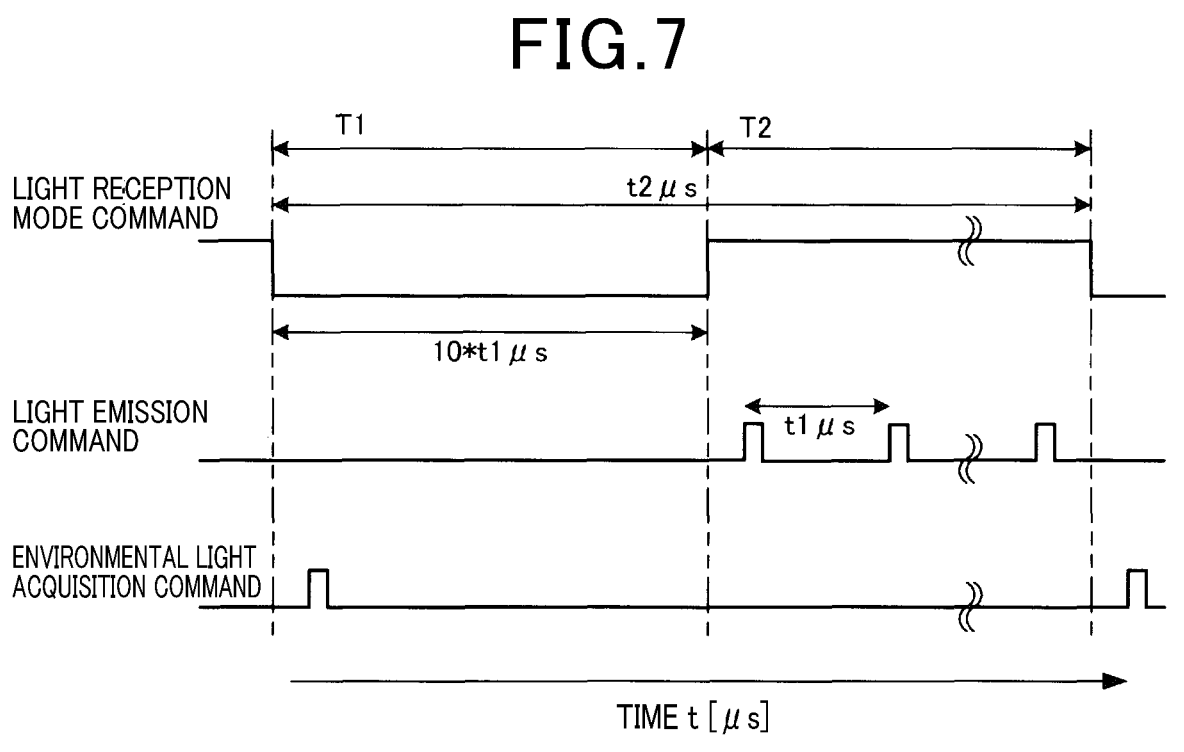

The light emission part 30 includes a light emission control part 31, a light emitting element 32, and a collimator lens, and discretely emits detection light a plurality of times at each unit scanning angle SC. The light emitting element 32 is one or more infrared laser diodes, for example, which emits infrared laser light as detection light. The light emission part 30 may include a single light emitting element or a plurality of light emitting elements arranged in the vertical direction. If a plurality of light emitting elements is included, the light emission control part 31 may change a light emitting element to emit light in accordance with a scan timing. In response to a light emission control signal for instructing the light emitting elements to emit light, which is input by the control device 100 at each unit scanning angle, the light emission control part 31 drives the light emitting elements by a driving signal of a pulse-driven waveform to emit infrared laser light. In the present embodiment, as illustrated in FIGS. 6 and 7, the control device 100 transmits a light emission command for instructing the light emission control part 31 to emit detection light. The infrared laser light emitted from the light emission part 30 is reflected by the scanning mirror 42 and directed toward the outside of the lidar 200, that is, toward the range in which detection of the target object is desired.

The electric motor 40 includes an electric motor driver not illustrated. The electric motor 40 has a rotation angle sensor 41 arranged for detecting the rotation angle of the electric motor 40. Upon receipt of a rotation angle instruction signal output by the control device 100 in response to input of a rotation angle signal from the rotation angle sensor 41, the electric motor driver changes the voltage applied to the electric motor 40 and controls the rotation angle of the electric motor 40. The electric motor 40 is an ultrasonic motor, a brushless motor, or a brush motor, for example, which includes a known mechanism for driving and recip-rocating in the scanning angle range SR. The electric motor 40 has a scanning mirror 42 at an end portion of its output shaft. The scanning mirror 42 is a reflector, that is, a mirror body that performs scanning with the detection light emitted from the light emitting element 32 in the horizontal direction HD. The scanning mirror 42 is driven to reciprocate by the electric motor 40 to perform scanning in the scanning angle range SR in the horizontal direction HD. One reciprocation of scanning by the scanning mirror 42 is called one frame that is the unit of detection by the lidar 200. The light emission part 30 emits detection light in accordance with only the outgoing displacement of the scanning mirror 42, and does not emit detection light in accordance with the returning displacement of the scanning mirror 42. That is, the lidar 200 performs object detection only in one direction, specifically, only in the outgoing direction in the scanning angle range SR. The scanning mirror 42 performs scanning with detection light and receives reflection light in the scanning angle range of 120 degrees or 180 degrees, for example. The scanning mirror 42 may perform scanning in the vertical direction VD as well as in the horizontal direction HD, that is, may change the scanning position in the vertical direction VD. In order to perform scanning in the horizontal direction HD and the vertical direction VD, the scanning mirror 42 may be a multifaceted mirror body, for example, a polygon mirror, or may be a unifacial mirror body to be swung in the vertical direction VD or may include another unifacial mirror body to be swung in the vertical direction VD. The scanning mirror 42 may be rotationally driven by the electric motor 40 to execute rotational scanning. In this case, the light emission part 30 and the light reception part 20 execute a light emission process and a light reception process in correspondence with the scanning angle range SR. If the scanning angle range SR of about 60 degrees is achieved, for example, the scanning mirror 42 may not be provided, and a light receiving element array of a width corresponding to the scanning angle range SR may be provided instead so that the detection of the target object, that is, the ranging process of the target object may be executed through selection of lines and columns in sequence.

The detection light emitted from the light emission part 30 is reflected by the scanning mirror 42, and the target object is horizontally scanned by the unit scanning angle SC in the scanning angle range SR. The detection reflection light that is the detection light having been reflected by the target object is then reflected by the scanning mirror 42 toward the light reception part 20, and is entered into the light reception part 20 at each unit scanning angle SC. The light reception part 20 executes a light reception process by line in accor-dance with the timing of light emission by the light emission part 30. The unit scanning angle SC at which the light reception process is executed is incremented in sequence, thereby to enable scanning for the light reception process in the desired scanning angle range SR. The light emission part 30 and the light reception part 20 may be rotated together with the scanning mirror 42 by the electric motor 40, or may be separated from the scanning mirror 42 and may not be rotated by the electric motor 40. Further, the scanning mirror 42 may not be provided, and a plurality of light receiving pixels arranged in an array corresponding to the scanning angle range SR or a light receiving element array 22 may be provided instead to directly emit laser light in sequence to the outside and directly receive reflection light while switch-ing among the light receiving pixels in sequence.

Figure 4:
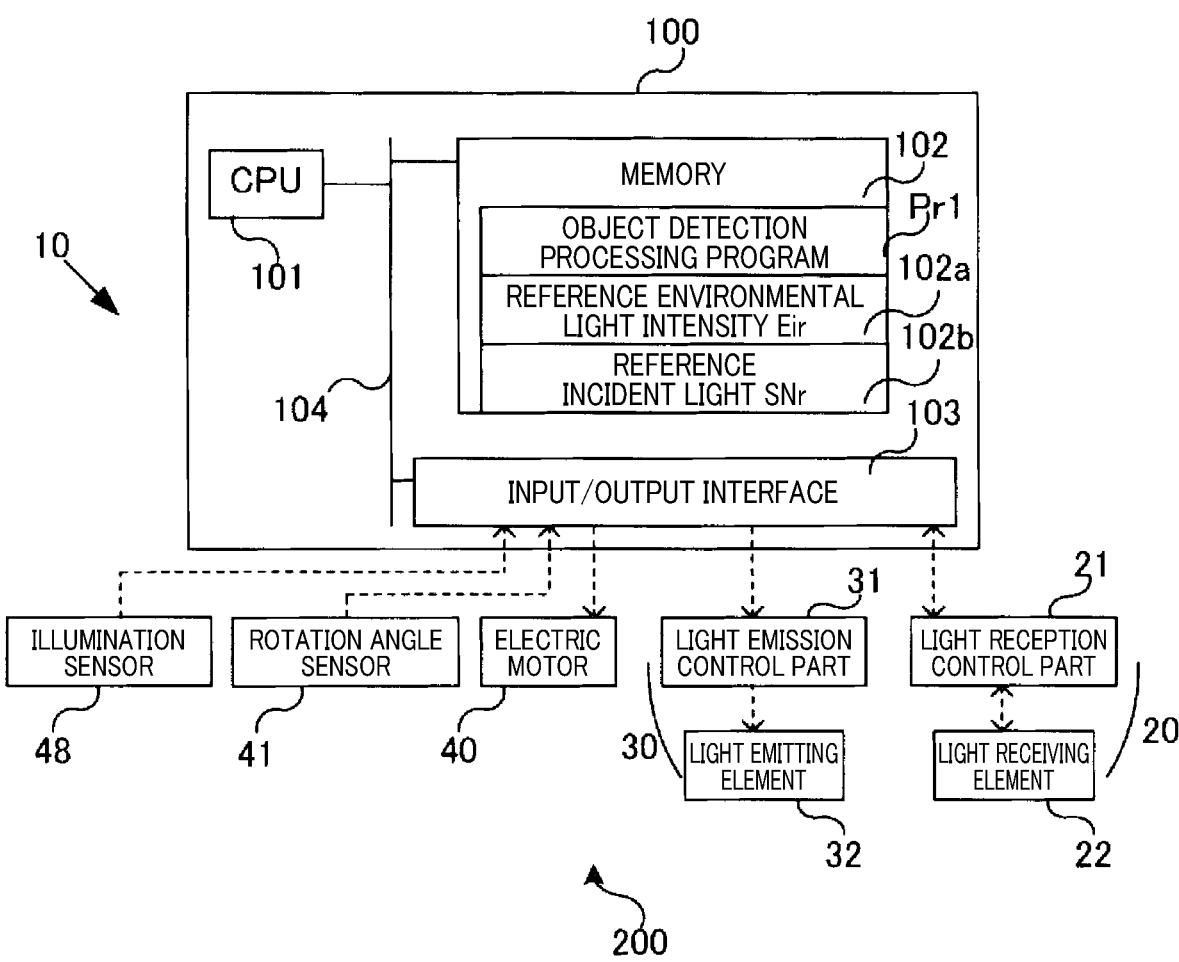
FIG. 4 is a block diagram illustrating a functional configuration of the object detection apparatus according to the first embodiment.

As illustrated in FIG. 4, the control device 100 includes a central processing unit (CPU) 101 as an arithmetic operation unit, a memory 102 as a storage unit, an input/output interface 103 as an input/output unit, and a clock generator not illustrated. The CPU 101, the memory 102, the input/output interface 103, and the clock generator are connected in a bidirectionally communicable manner via an internal bus 104. The memory 102 includes a memory that stores an object detection process program Pr1 for executing an object detection process in a non-volatile and read-only manner, for example, a ROM, and a memory that is readable and writable by the CPU 101, for example, a RAM. The object detection process program Pr1 includes a time determination process for determining the environmental light acquisition time T1 for detecting the intensity of environmental light or the light emission time T2 for detecting an object. The non-volatile and read-only area in the memory 102 includes an environmental light reference storage area 102a that stores a reference environmental light intensity Eir that is a reference for determining the environmental light acquisi-tion time, and a reference SN storage area 102b that stores a reference SNr that is an SN as a reference for determining the light emission time. However, the non-volatile and read-only area may be writable at the time of updating of a program or a reference value. The CPU 101, that is, the control device 100 functions as an object detection unit and a time determination part by developing and executing the object detection process program Pr1 from the memory 102, in a readable and writable memory. The CPU 101 may be a single CPU, or a plurality of CPUs executing corresponding programs, or a multitask-type or multithread-type CPU that can execute a plurality of programs at the same time. The process of ranging to the object using the light emission timing and the light reception timing may be executed by the light reception control part 21 or may be executed by the control device 100 as one step of the object detection process.

The input/output interface 103 is connected to the light reception control part 21 constituting the light reception part 20, the light emission control part 31 constituting the light emission part 30, the electric motor 40, the rotation angle sensor 41, and the illumination sensor 48 via their respective control signal lines. A light emission control signal is transmitted to the light emission control part 31. A light reception control signal for instructing the light reception control part 21 to perform a light reception process for acquiring environmental light or a light reception process for object detection is transmitted to the light reception control part 21. An incident light intensity signal indicating the environmental light intensity or the detection reflection light intensity is received from the light reception control part 21. A rotation angle instruction signal is transmitted to the electric motor 40, and a rotation angle signal is received from the rotation angle sensor 41. An illumination signal indicating the illumination of the environmental light around the object detection apparatus 10 is received from the illumination sensor 48.

Figure 5:
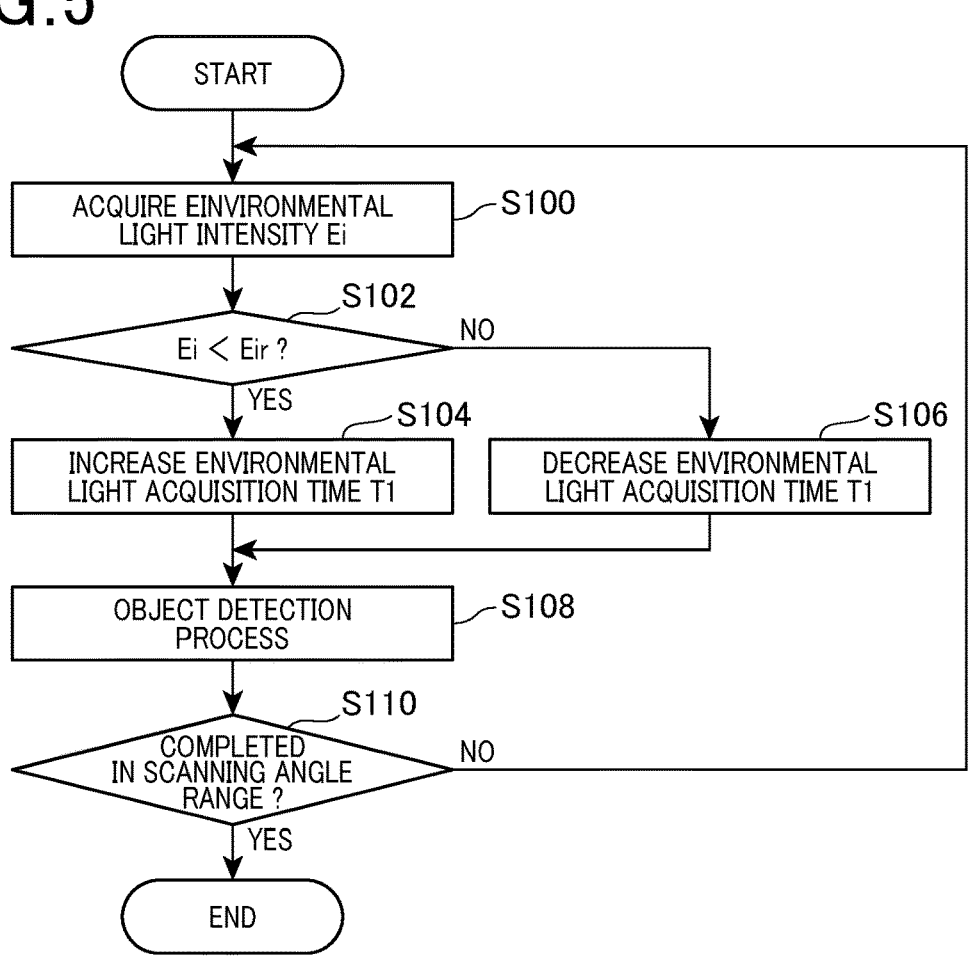
FIG. 5 is a flowchart of an object detection process executed by the object detection apparatus according to the first embodiment.

The object detection process including acquisition of environmental light intensity executed by the object detection apparatus 10 according to the first embodiment will be described. The processing routine illustrated in FIG. 5 is repeatedly executed, for example, from the start to stop of the vehicle control system or from turning on to turning off of the start switch, at predetermined time intervals, for example, at every several hundred ms. The processing flow illustrated in FIG. 5 is started by the CPU 101 executing the object detection process program Pr1. In the following description, the object detection time (unit) for which the environmental light intensity is acquired and the detection reflection light is acquired at the unit scanning angles SC or in the rows will be called one slot, and the time (unit) for which one reciprocation is done between the beginning and end of the scanning angle range SR will be called one frame.

The CPU 101 acquires, via the input/output interface 103, the environmental light intensity Ei acquired in a previous frame or a previous slot acquired earlier than the present or the environmental light intensity Ei presently obtained by the illumination sensor 48 (step S100). One slot in the object detection apparatus 10, that is, an object detection time t2 includes the environmental light acquisition time T1 and the light emission time T2 as illustrated in FIGS. 6 and 7. In the present embodiment, T1+T2=t2 μs (constant), where T1=t1 μs and T2=t2−t1 μs. The time t1 is also called exposure time that is 10 to 13 μs, for example, and t2 is 250 to 270 μs, for example. Therefore, the time required for processing one slot is 250 to 270 μs, for example. The integrated environmental light amount [lux·sec] or [mJ/cm²], that is, the exposure light amount is obtained by the environmental light intensity Ei×t1. These numerical values are mere examples and the present invention is not limited to these numerical values. For example, the environmental light acquisition time T1 for acquiring the environmental light, that is, t1, and a light emission command interval t1 in the light emission time T2 may take on different values. In addition, although the light emission time T2 is started after the acquisition of the environmental light in one slot, the environmental light acquisition time T1 may be started after the light emission time T2. The environmental light intensity Ei in a previous frame or a previous slot may take on the value of the environmental light intensity Ei obtained in the environmental light acquisition time T1 in the immediately preceding frame or the immediately preceding slot or may take on the maximum value or average value of the environmental light intensity Ei obtained in the environmental light acquisition time T1 in several immediately preceding frames or several immediately preceding slots. The environmental light intensity Ei obtained from the illumination sensor 48 is an illumination value indicating brightness in the surrounding environment of the object detection apparatus 10 at the present point of time. In the case of acquiring the environmental light intensity Ei using the illumination sensor 48, the environmental light acquisition time T1 can be set simply without using the past environmental light intensity data, that is, the environmental light intensity Ei in a previous frame or a previous slot.

The CPU 101 determines whether the acquired environmental light intensity Ei is lower than the reference environmental light intensity Eir (step S102). The environmental light intensity Eir is the intensity of the incident light on the light reception part 20 with which the dynamic range of an environmental light image or a background light image obtained by the light receiving element array 22 is equal to or greater than a desired value during the environmental light acquisition time T1 that is a reference, that is, the exposure time. For example, the environmental light intensity Eir can be set to the intensity of incident light with which 50% of the theoretical maximum dynamic range (the exposure time×the number of light receiving pixels) can be obtained. The environmental light image is a pixel image that is formed in correspondence with the light receiving pixels 221 to 225 of the light receiving element array 22 and is a monochrome image that is represented by pixel values, that is, brightness values, obtained from the light receiving pixels 221 to 225 of the light receiving element array 22 due to incident of environmental light. The dynamic range of desired values may be, instead of the above-mentioned dynamic range, a dynamic range in which individual subjects and a background included in an environmental light image can be clearly identified, for example, which is equal to or greater than a dynamic range in which a captured image is not regarded as being underexposure.

If determining that the environmental light intensity Ei is lower than the reference environmental light intensity Eir, that is, Ei<Eir (step S102: Yes), the CPU 101 increases the environmental light acquisition time T1 (step S104). For example, as illustrated in FIG. 7, the CPU 101 sets the environmental light acquisition time T1 from t1 to 10×t1 μs, that is, the time increased ten-fold. As a result, the light emission time T2 is decreased by 9×t1 μs. This enables the acquisition of an environmental light image in a wider dynamic range even under dark environments, thereby improving the accuracy of determining the target object in the environmental light image. If determining that the environmental light intensity Ei is equal to or greater than the reference environmental light intensity Eir, that is, Ei≥Eir (step S102: No), the CPU 101 decreases the environmental light acquisition time T1 (step S106). For example, if the environmental light acquisition time T1 is 10×t1 μs as illustrated in FIG. 7, the CPU 101 sets the environmental light acquisition time T1 to the time t1 μs decreased to one tenth. In this case, it is possible to acquire an environmental light image in a sufficient dynamic range even in a shorter time, so that the target object in the environmental light image can be determined at a desired accuracy of determination. In addition, since the light emission time T2 is increased by 9×t1 μs, the object detection performance can be improved. The increase and decrease in the environmental light acquisition time T1 are increase and decrease in time relative to the environmental light acquisition time T1 set before the determination in step S102. Thus, absolute increased and decreased in time may not be necessarily required. In addition, the decrease in the environmental light acquisition time T1 may be a setting to a predetermined initial value. In this case, the setting of T1=t1 is made regardless of the value of the environmental light acquisition time T1 set before the determination in step S102. In addition to the reference environmental light intensity Eir, a second reference environmental light intensity Eir2 larger in value than the reference environmental light intensity Eir may be used. If the environmental light intensity Ei is higher than the reference environmental light intensity Eir2, the environmental light acquisition time T1 may be made shorter than t1.

After setting the environmental light acquisition time T1, the CPU 101 executes an object detection process (step S108). The object detection process includes an acquisition process of the environmental light intensity executed in the environmental light acquisition time T1 and an acquisition process of the detection reflection light executed in the light emission time T2 at the unit scanning angle SC as illustrated in FIGS. 6 and 7. The CPU 101 outputs the light reception mode command signal 0 to the light reception control part 21 and the light emission control part 31 in order to switch the light reception mode to the environmental light acquisition mode. The CPU 101 outputs the environmental light acquisition command to the light reception control part 21. Upon input of the light reception mode command signal 0 and receipt of the environmental light acquisition command, the light reception control part 21 starts the acquisition of the environmental light. The light reception control part 21 acquires the environmental light intensity by, for example, acquiring the intensities of the environmental light received by the light receiving pixels 221 to 225 of the light receiving element array 22 during the environmental light acquisition time T1, that is, by acquiring the intensities of the incident light. As a result, the pixel image represented by the light receiving pixels 221 to 225 is obtained at the unit scanning angle SC. At the acquisition or determination of the environmental light intensity, the maximum value or average value of the intensities of incident light received by the light receiving pixels 221 to 225 of the light receiving element array 22 can be used. For example, after the increase in the environmental light acquisition time T1 illustrated in FIG. 7, as compared to before the increase in the environmental light acquisition time T1 illustrated in FIG. 6, the environmental light intensity is acquired in the ten-fold time and the exposure time is increased. Accordingly, the integrated environmental light amount (T1×Ei) is increased so that it is possible to obtain an environmental light image in a wider dynamic range. This improves the accuracy of determining the target object in the environmental light image.

After a lapse of the environmental light acquisition time T1, the CPU 101 outputs the light reception mode command signal 1 to the light reception control part 21 and the light emission control part 31 in order to switch the light reception mode to the detection reflection light acquisition mode. The light emission control part 31 causes the light emitting element 32 to repeatedly emit light at intervals of t1 μs. Upon entrance of the initial detection reflection light corresponding to the light emission and receipt of the light reception mode command signal 1, the light reception control part 21 starts the acquisition of the detection reflection light. The light reception control part 21 acquires the detection reflection light, for example, by receiving the detection reflection light that is entered in accordance with the timing of emission of the detection light by the light emission part 30 at the intervals of t1 μs during the light emission time T2. For example, before the increase in the environmental light acquisition time T1 illustrated in FIG. 6, the detection light is emitted 19 times, and after the increase in the environmental light acquisition time T1 illustrated in FIG. 7, the number of times when the detection light is emitted is decreased to nine times. The light reception control part 21 also functions as a distance calculation unit that executes a distance calculation process by which to calculate the distance to the object that is present at the unit scanning angle SC and has reflected the detection light and caused the detection reflection light, using the timing of emission of the detection light by the light emission part 30 and the timing of reception of the detection reflection light by the light receiving element array 22. Alternatively, the CPU 101 may function as a distance calculation unit that executes a similar distance calculation process.

At the end of the object detection process, the CPU 101 determines whether the scanning for object detection has completed on all the lines constituting the scanning angle range SR (step S110). If the CPU 101 determines that the scanning for object detection has not yet completed on all the lines (step S110: No), the process moves to step S100 and the CPU 101 executes steps S100 to S108 using the environmental light intensity Ei acquired this time. If the CPU 101 determines that the scanning for object detection has completed on all the lines (step S110: Yes), the processing routine is ended. When the environmental light intensity Ei is acquired and the calculation process of the distance to the object is executed on all the lines constituting the scanning angle range SR, an environmental light image corresponding to the scanning angle range SR is formed and a reflection point image indicating the distance to the object present in the scanning angle range SR is formed. Since the distance to the object is calculated, it is possible to improve the accuracy of determining the target object.

According to the object detection apparatus 10 in the first embodiment described above, if the obtained environmental light intensity is low, the environmental light acquisition time T1 for acquiring the environmental light intensity is increased so that it is possible to increase the integrated environmental light amount and obtain an environmental light image in a wide dynamic range. In addition, it is possible to acquire an environmental light image in a wider dynamic range even with the environmental light intensity Ei lower than ever before, that is, even under a dark environment. Therefore, it is possible to improve the accuracy of determining the target object in the environmental light image. For example, it is possible to improve the accuracy of matching the coordinate positions of light reception points in the environmental light image and the coordinate positions of the object, in a process of fusion with a captured image obtained by a camera. As a result, it is possible to improve the accuracy of associating the detection reflection points of the object obtained by the object detection process with the coordinate positions of the object in the captured image, and improve the accuracy of detecting the position of the object and the distance to the object. In addition, if the environmental light intensity Ei is higher than the reference environmental light intensity Eir, the environmental light acquisition time T1 is decreased so that the light emission time T2 is increased and the object detection performance can be improved. Since the object detection time t2 is constant, the object detection can be always completed at constant time intervals, thereby realizing high spatial resolving power at any time.

In the above description, the sum of the environmental light acquisition time T1 and the light emission time T2, that is, the object detection time t2 is constant. However, if the environmental light acquisition time T1 is increased about three-fold, the light emission time T2 may not be decreased in accordance with the increase in the environmental light acquisition time T1. In this case, the processing time for object detection in the scanning angle range SR is increased but the accuracy of object detection can be maintained at a predetermined level.

In the above description, the environmental light acquisition time T1 is decreased if the environmental light intensity Ei is equal to or higher than the reference environmental light intensity Eir. Alternatively, the current environmental light acquisition time T1 may be maintained until the environmental light intensity corresponding to the environmental light intensity Ei=the maximum dynamic range is reached, and the environmental light acquisition time T1 may be decreased when the environmental light intensity corresponding to the environmental light intensity Ei=the maximum dynamic range has been reached. In this case, it is possible to obtain an environmental light image by a larger integrated environmental light amount, that is, by a larger exposure light amount. Further, in the above description, the environmental light acquisition time T1 is either t1 μs or 10×t1 μs. Alternatively, the environmental light acquisition time T1 may be further subdivided. For example, 25%, 50%, or 75% of the maximum dynamic range may be set as the reference environmental light intensity Eir that takes on the value for determining the magnitude of the environmental light intensity Ei, and the corresponding environmental light acquisition time T1 may be set to 10×t1 μs, 5×t1 μs, or 2×t1 μs. In this case, the increase amount in the environmental light acquisition time T1 can be optimized. The reference environmental light intensity Eir may take on any of a plurality of other values. In addition, a table or arithmetic equation for association of the reference environmental light intensity Eir with the environmental light intensity Ei may be prepared so that the environmental light acquisition time T1 may be dynamically set in accordance with the environmental light intensity Ei. In this case, the environmental light acquisition time T1 can be set more suitably to the environmental light intensity Ei, thereby achieving both the increase in the dynamic range and the improvement of object detection performance.

Second Embodiment

In the first embodiment, the environmental light acquisition time T1 is determined in accordance with the environmental light intensity Ei. In a second embodiment, a light emission time T2 is determined in accordance with the characteristics of detection reflection light in a light emission time T2, and an environmental light acquisition time T1 is changed. A configuration of an object detection apparatus in the second embodiment is similar to the configuration of the object detection apparatus 10 in the first embodiment, and thus description thereof will be omitted in lieu of providing identical reference signs.

Figure 8:
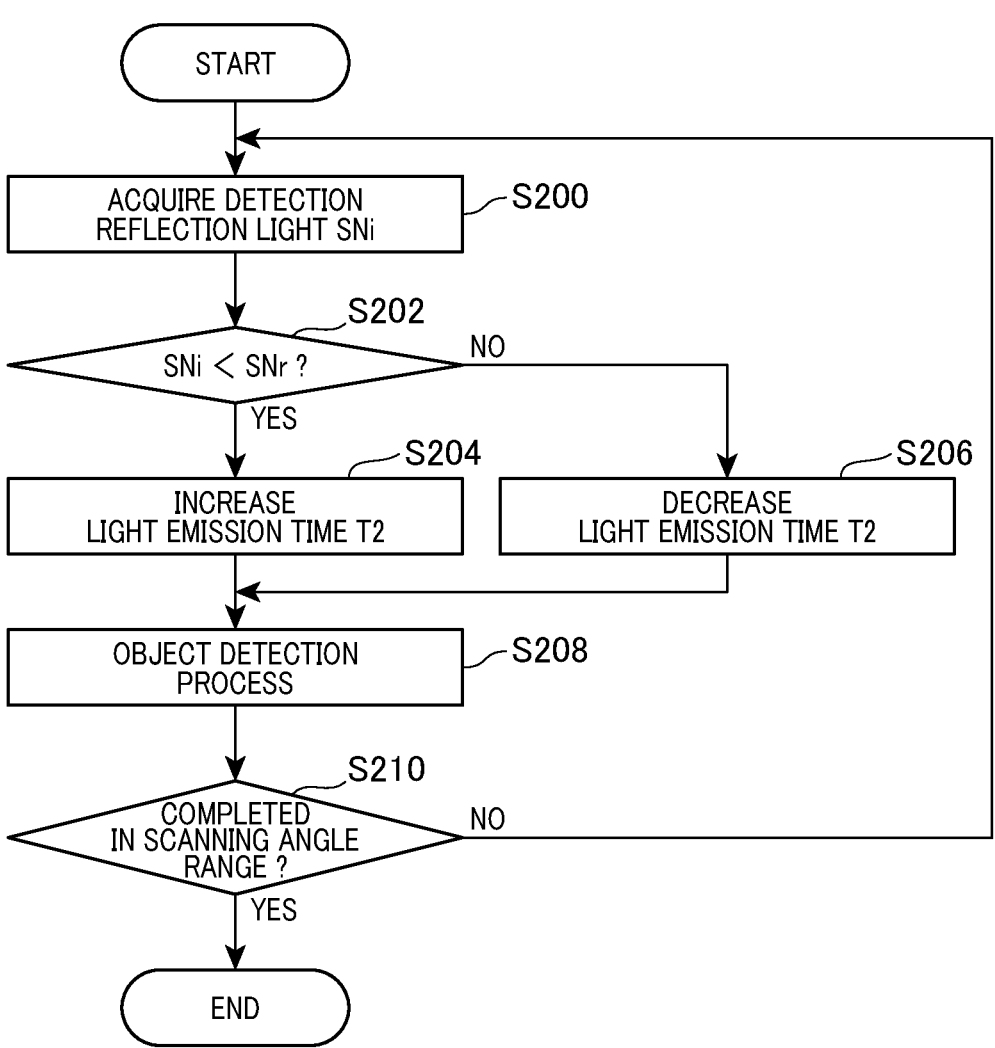
FIG. 8 is a flowchart of an object detection process executed by an object detection apparatus according to a second embodiment.

An object detection process including acquisition of an environmental light intensity executed by an object detection apparatus 10 in the second embodiment will be described. A processing routine illustrated in FIG. 8 is repeatedly executed at predetermined time intervals, for example, every several 100 ms, from start to stop of a vehicle control system, or from turning on to off of a start switch. The processing flow illustrated in FIG. 8 is executed by a CPU 101 executing an object detection process program Pr1. Out of steps illustrated in FIG. 8, steps similar to the ones illustrated in FIG. 5 will be briefly described.

The CPU 101 acquires, via an input/output interface 103, an S/N ratio [dB] or an SN difference [dB] in detection reflection light SNi, that is, a detection reflection optical signal acquired at a timing earlier than the current time (step S200). In the present embodiment, the S/N ratio is used as a characteristic of detection reflection light. Instead of this, the maximum value, average value, or mode of signal intensity of the detection reflection signal may be used as a characteristic of the detection reflection light. One slot in the object detection apparatus 10 includes an environmental light acquisition time T1 and a light emission time T2 as illustrated in FIGS. 6 and 7. The detection reflection light SNi in a preceding slot takes, for example, the average value or maximum value of the detection reflection signal obtained in the light emission time T2 in the immediately preceding slot or the average value or maximum value of the detection reflection light signal obtained in the light emission time T2 in immediately preceding several slots.

The CPU 101 determines whether the acquired detection reflection light SNi is lower than a reference SNr (step S202). The reference SNr is a signal-to-noise ratio at which the reflection light from the object can be discriminated from environmental light or background light in the detection reflection light signal, and is, for example, 20 dB. Alternatively, the determination may be made using, instead of the comparison of the S/N ratios, a reference deviation σ from a peak value in the histogram of the detection reflection light SNi. For example, 10 σ may be used as a reference. If the environmental light intensity is high, the detection reflection light SNi decreases even at the same detection reflection light intensity, and if the environmental light intensity is low, the detection reflection light SNi increases even at the same detection light intensity. If the environmental light intensity is high, it is possible to obtain an environmental light image in a sufficient dynamic range in the short environmental light acquisition time T1. In the present embodiment, the object detection time that is the total sum of the environmental light acquisition time T1 and the light emission time T2 is constant. However, the environmental light acquisition time T1 and the light emission time T2 are complementary to each other, and it is possible to achieve both the acquisition of an environmental light image in a sufficient dynamic range and the acquisition of a detection reflection light signal at a favorable S/N ratio even if the environmental light acquisition time T1+the light emission time T2 that is the object detection time is constant.

If determining that the detection reflection light SNi is lower than the reference SNr, that is, SNi<SNr (step S202: Yes), the CPU 101 increases the light emission time T2 (step S204). As a result, the number of times when the light emission part 30 emits light, that is, the occasions of light emission or the light emission timings increases, the number of times when the detection reflection light enters the light receiving element array 22 increases, and the signal intensity of the detection reflection light increases. Therefore, it is possible to detect an object present at a long distance even under bright conditions in which the environmental light intensity is high. The fact that the SNi of detection reflection light is low means that the intensity of environmental light is high, so that it is possible to acquire an environmental light image in a sufficient dynamic range even if the environmental light acquisition time T1 is decreased due to the increase in the light emission time T2. If determining that the detection reflection light SNi is equal to or greater than the reference SNr, that is, SNi≥SNr (step S202: No), the CPU 101 decreases the light emission time T2 (step S206). In this case, it is possible to detect an object present at a long distance in a short time even under dark conditions in which the environmental light intensity is low. In addition, the detection reflection light obtained in the light emission time T2 currently set is sufficiently differentiated from the environmental light, suggesting that the environmental light intensity may be low. Thus, decreasing the light emission time T2 and increasing the environmental light acquisition time T1 allows acquisition of an environmental light image in an extended dynamic range. The increase and decrease in the light emission time T2 are increase and decrease in time relative to the light emission time T2 set before the determination in step S202. Thus, absolute increase and decrease in time may not be necessarily required. In addition, the decrease in the light emission time T2 may be a setting to a predetermined initial value. In this case, the setting of T2=t2−t1 is made regardless of the value of light emission time T2 set prior to the determination in step S202. Further, there is an upper limit on the increase in the light emission time T2, and for example, the light emission time T2 is increased such that at least the state of the environmental light acquisition time T1=t1 is maintained.

After setting the light emission time T2, the CPU 101 executes an object detection process (step S208). The object detection process includes an acquisition process of environmental light intensity executed in the environmental light acquisition time T1 and an acquisition process of detection reflection light executed in the light emission time T2 at the unit scanning angle SC as illustrated in FIGS. 6 and 7. At the end of the object detection process, the CPU 101 determines whether the scanning for object detection has completed on all the lines constituting the scanning angle range SR (step S210). If the CPU 101 determines that the scanning for object detection has not yet completed on all the lines (step S210: No), the process moves to step S200 and the CPU 101 executes steps S200 to S208 using the environmental light intensity Ei acquired this time. If the CPU 101 determines that the scanning for object detection has been completed on all the lines (step S210: Yes), the processing routine is ended. When the environmental light intensity Ei is acquired and the calculation process of the distance to the object has been executed on all the lines constituting the scanning angle range SR, an environmental light image corresponding to the scanning angle range SR is formed and a reflection point image indicating the distance to the object present in the scanning angle range SR is formed.

According to the object detection apparatus 10 in the second embodiment described above, if the S/N ratio of the obtained detection reflection light, that is, the S/N ratio of the detection reflection light signal is low, the light emission time T2 for acquiring the detection reflection light is increased. Accordingly, it is possible to obtain detection reflection light at a higher S/N ratio and detect an object at a longer distance. As a result, it is possible to improve the discrimination accuracy of the target object by the object detection apparatus 10. In addition, although the object detection time is constant, the magnitude of the S/N ratio of the detection reflection light and the magnitude of the environmental light intensity Ei are complementary to each other. Thus, even if the environmental light acquisition time T1 is decreased by increasing the light emission time T2, it is possible to acquire an environmental light image in a desired dynamic range. Further, it is possible to improve the SN rate of the detection reflection light and improve the integrated environmental light amount within a certain time required for an object detection process on one line in the scanning angle range SR. Thus, it is possible to complete the object detection process within a predetermined object detection time, thereby realizing a high spatial resolving power at any time. The object detection time is not limited to one predetermined time but may be selected, for example, from among two or more prepared object detection time candidates in accordance with temporal conditions for obtaining an environmental light image in a desired dynamic range and the characteristics of detection reflection light. In this case as well, there occur no great fluctuations in spatial resolving power and thus desired spatial resolving power can be realized.

Other Embodiments (1) In the above embodiments, the acquisition of the environmental light intensity Ei and the acquisition of the detection reflection light are continuously executed during the determined environmental light acquisition time T1 and the light emission time T2. Differently from this, if an appropriate integrated environmental light amount has been obtained, for example, if the average value of the integrated environmental light amount and the maximum value of the output values (pixel values) of the light receiving pixels have exceeded predetermined reference values, the environmental light acquisition time T1 may be ended and a shift to the light emission time T2 may take place. Alternatively, if appropriate detection reflection light SNi has been obtained, for example, if the peak light amount indicated by a detection reflection light signal has exceeded a predetermined reference value, the light emission time T2 may be ended and a shift to the environmental light acquisition time T1 may take place. In these cases, the environmental light acquisition time T1 and the light emission time T2 can be set more appropriately.

(2) In the above embodiments, the environmental light intensity and the detection reflection light are acquired line by line corresponding to the unit scanning angle SC. Alternatively, the environmental light intensity and the detection reflection light may be acquired, that is, they may be output to the control device 100 after scanning is completed on all the lines corresponding to the scanning angle range SR. In addition, the environmental light acquisition time T1 or the light emission time T2 may be changed by the unit scanning angle SC. In this case, it is possible to improve the property of following changes in the environmental light intensity and improve the dynamic range of an environmental light image by the unit scanning angle SC. Alternatively, the environmental light acquisition time T1 or the light emission time T2 may be changed by the scanning angle range SR. In this case, it is possible to suppress influence of temporary changes in the environmental light intensity such as noise and obtain an environmental light image in an improved dynamic range with less fluctuation in the entire scanning angle range SR. The same thing applies to the SN ratio of the detection reflection light.

(3) In the first embodiment, the environmental light acquisition time T1 is set in accordance with the intensity of environmental light. Differently from this, the environmental light acquisition time T1 may be set in accordance with at least one of the current time, weather, map information, vehicle information, and user instruction.

In the case of setting the environmental light acquisition time T1 in accordance with the current time, for example, the control device 100 may determine that the environmental light is weak at the current time that is between one hour before sunset and one hour after sunrise, that is, in the nighttime, and set the environmental light acquisition time T1 to be longer. The control device 100 may determine that the environmental light is strong in the remaining time, that is, in the daytime, and set the environmental light acquisition time T1 to be shorter. The sunrise and sunset times can be acquired through road-to-vehicle communication or mobile data communication. In this case, the environmental light acquisition time T1 can be set more appropriately by using the time information that is a parameter not depending on the vehicle surrounding environment.

In the case of setting the environmental light acquisition time T1 in accordance with weather, for example, the control device 100 may determine that the environmental light is weak in rainy or snowy weather in which a raindrop sensor detects raindrops or snowflakes, and set the environmental light acquisition time T1 to be longer. Otherwise, the control device 100 may determine that the environmental light is strong in clear weather or cloudy weather in which a raindrop sensor detects no raindrops or snowflakes, and set the environmental light acquisition time T1 to be shorter. In this case, the environmental light acquisition time T1 can be set more appropriately, reflecting the vehicle surrounding environment that is weather information.

In the case of setting the environmental light acquisition time T1 in accordance with map information, for example, the control device 100 may determine that the environmental light is weak if the vehicle 50 is located on a road in a tunnel or near an obstacle shutting off external light, and set the environmental light acquisition time T1 to be longer. Otherwise, the control device 100 may determine that the environmental light is strong in other environments and set the environmental light acquisition time T1 to be shorter. The map information may be stored in a vehicle control device (not shown) of the vehicle 50 or may be acquired as appropriate from an external server through telecommunication. The position of the vehicle 50 can be detected through a Global Navigation Satellite System (GNSS), road-to-vehicle communication, or mobile data communication. In this case, the environmental light acquisition time T1 can be set reflecting the magnitude of the environmental light resulting from the position of the vehicle 50.

In the case of setting the environmental light acquisition time T1 in response to vehicle information or a user instruction, for example, the control device 100 may determine that the environmental light is weak when the headlight is on, and set the environmental light acquisition time T1 to be longer. Otherwise, the control device 100 may determine that the environmental light is strong when the headlight is off, and set the environmental light acquisition time T1 to be shorter. The vehicle information may include information on the on/off state of the headlight and the on/off state of the windshield wiper without intervention of the user, that is, the information on the auto-headlight and auto-windshield wiper. The user instruction may include information on the on/off state of the headlight and the on/off state of the windshield wiper with intervention of the user. In this case, the environmental light acquisition time T1 can be set more appropriately by using the results of detection by other sensors included in the vehicle 50. Using a user instruction makes it possible to reflect the vehicle surrounding environment that is felt by the user, that is, the driver. Therefore, the environmental light acquisition time T1 can be set further more appropriately.

(4) In the above-described embodiments, the object detection apparatus 10 executing time determination and object detection is implemented by the CPU 101 executing the object detection process program Pr1. Alternatively, the object detection apparatus 10 may be implemented hardware-wise by a pre-programmed integrated circuit or discrete circuit. That is, the control part and its operations in the above embodiments may be implemented by a dedicated computer that is provided by configuring a processor programmed to execute one or more functions embodied by computer programs and a memory. Alternatively, the control part and its operations described in the present disclosure may be implemented by a dedicated computer that is provided by configuring a processor with one or more dedicated hardware logical circuits. Otherwise, the control part and its operations described in the present disclosure may be implemented by one or more dedicated computers that are configured by combining a processor programmed to execute one or more functions and a memory with one or more hardware logic circuits. The computer programs may be stored in a computer-readable non-volatile tangible recording medium, as instructions to be executed by a computer.

The present disclosure has been described above based on embodiments and modifications. The above-described embodiments of the invention are intended to facilitate the understanding of the present disclosure and are not intended to limit the present disclosure. The present disclosure can be changed or modified without deviating from the gist of the present disclosure and the claim, and the present disclosure includes its equivalents. For example, the technical features of the embodiments corresponding to the technical features of the aspects described in the Summary of the Invention and the technical features of modifications can be replaced or combined as appropriate in order to solve some or all of the above-described issues or in order to attain some or all of the above-described advantageous effects. In addition, the technical features can be deleted as appropriate unless they are described as being essential herein.

What is claimed is:

1. An object detection apparatus comprising:
a light emission part that emits laser light;
a light reception part;
a time determination part that determines an environmental light acquisition time, which is a duration, during which to acquire environmental light in accordance with intensity of the environmental light obtained prior to determining the environmental light acquisition time;
a light reception control part that controls an operation of receiving incident light by the light reception part and causes the light reception part to execute a light reception operation by which to acquire the environmental light during the determined environmental light acquisition time; and
a light emission control part that controls a light emission operation by the light emission part,
wherein an object detection time, which is a sum of the environmental light acquisition time and a light emission time during which the light emission part emits light for object detection, is constant.

2. The object detection apparatus according to claim 1, wherein
the time determination part increases the environmental light acquisition time if the intensity of the environmental light acquired by the light reception part is lower than a predetermined reference value.

3. The object detection apparatus according to claim 1, wherein the time determination part decreases the environmental light acquisition time if the intensity of the environmental light acquired by the light reception part is higher than the predetermined reference value.

4. The object detection apparatus according to claim 1, wherein the time determination part increases the environmental light acquisition time if the intensity of the environmental light acquired by an illumination sensor different from the light reception part is lower than a predetermined reference value.

5. The object detection apparatus according to claim 1, wherein the time determination part decreases the environmental light acquisition time if the intensity of the environmental light acquired by an illumination sensor different from the light reception part is higher than the predetermined reference value.

6. An object detection apparatus comprising:

a light emission part that emits laser light;

a light reception part;

a time determination part that determines an environmental light acquisition time, which is a duration, during which to acquire environmental light in accordance with a time of day, wherein the time of day is determined based on data received via mobile data communication;

a light reception control part that controls an operation of receiving incident light by the light reception part and causes the light reception part to execute a light reception operation by which to acquire the environmental light during the determined environmental light acquisition time; and a light emission control part that controls a light emission operation by the light emission part, wherein an object detection time, which is a sum of the environmental light acquisition time and a light emission time during which the light emission part emits light for object detection, is constant.

7. An object detection apparatus comprising:

a light emission part that emits laser light;

a light reception part;

a time determination part that determines an environmental light acquisition time, which is a duration, during which to acquire environmental light in accordance with weather in an environment of a vehicle, wherein the weather is determined based on data received from the vehicle;

a light reception control part that controls an operation of receiving incident light by the light reception part and causes the light reception part to execute a light reception operation by which to acquire the environmental light during the determined environmental light acquisition time; and a light emission control part that controls a light emission operation by the light emission part, wherein an object detection time, which is a sum of the environmental light acquisition time and a light emission time during which the light emission part emits light for object detection, is constant.

8. An object detection apparatus comprising:

a light emission part that emits laser light;

a light reception part;

a time determination part that determines an environmental light acquisition time, which is a duration, during which to acquire environmental light in accordance with map information, wherein the map information is determined based on data stored on a vehicle or received from an external server through telecommunication;

a light reception control part that controls an operation of receiving incident light by the light reception part and causes the light reception part to execute a light reception operation by which to acquire the environmental light during the determined environmental light acquisition time; and a light emission control part that controls a light emission operation by the light emission part, wherein an object detection time, which is a sum of the environmental light acquisition time and a light emission time during which the light emission part emits light for object detection, is constant.

9. An object detection apparatus comprising:

a light emission part that emits laser light;

a light reception part;

a time determination part that determines an environmental light acquisition time, which is a duration, during which to acquire environmental light in accordance with vehicle information, wherein the vehicle information is determined based on data received from a vehicle regarding a state of the vehicle;

a light reception control part that controls an operation of receiving incident light by the light reception part and causes the light reception part to execute a light reception operation by which to acquire the environmental light during the determined environmental light acquisition time; and a light emission control part that controls a light emission operation by the light emission part, wherein an object detection time, which is a sum of the environmental light acquisition time and a light emission time during which the light emission part emits light for object detection, is constant.

10. An object detection apparatus comprising:

a light emission part that emits laser light;

a light reception part;

a time determination part that acquires a user instruction to on-board equipment that is indicative of a state of environmental light and determines an environmental light acquisition time, which is a duration, during which to acquire environmental light in accordance with the acquired user instruction;

a light reception control part that controls an operation of receiving incident light by the light reception part and causes the light reception part to execute a light reception operation by which to acquire the environmental light during the determined environmental light acquisition time; and a light emission control part that controls a light emission operation by the light emission part.

11. An object detection apparatus comprising:

a light emission part that emits laser light;

a light reception part;

a time determination part that determines a time of light emission for object detection by the light emission part, which is a duration, in accordance with a characteristic of detection reflection light that is incident light on the light reception part in response to the light emission for object detection by the light emission part;

a light reception control part that controls an operation of receiving the incident light by the light reception part and causes the light reception part to perform a light reception operation by which to acquire environmental light during an environmental light acquisition time, which is a duration, determined by the determined light emission time and an object detection time; and a light emission control part that controls a light emission operation by the light emission part and causes the light emission part to perform the light emission operation for object detection during the determined light emission time, wherein the time determination part increases the light emission time and decreases the environmental light acquisition time if an S/N ratio that is the characteristic of the detection reflection light is lower than a predetermined reference value, and the object detection time is constant.

12. An object detection apparatus comprising:

a light emission part that emits laser light;

a light reception part;

a time determination part that determines a time of light emission for object detection by the light emission part, which is a duration, in accordance with a characteristic of detection reflection light that is incident light on the light reception part in response to the light emission for object detection by the light emission part;

a light reception control part that controls an operation of receiving the incident light by the light reception part and causes the light reception part to perform a light reception operation by which to acquire environmental light during an environmental light acquisition time, which is a duration, determined by the determined light emission time and an object detection time; and a light emission control part that controls a light emission operation by the light emission part and causes the light emission part to perform the light emission operation for object detection during the determined light emission time, wherein the time determination part decreases the light emission time and increases the environmental light acquisition time if the S/N ratio that is the characteristic of the detection reflection light is higher than the predetermined reference value, and the object detection time is constant.

13. A control method of an object detection apparatus comprising:

determining an environmental light acquisition time, which is a duration, during which to acquire environmental light in accordance with intensity of the environmental light;

causing a light reception part to execute a light reception operation by which to acquire the environmental light during the determined environmental light acquisition time; and causing a light emission part emitting laser light to execute a light emission operation for object detection after a lapse of the environmental light acquisition time, wherein an object detection time, which is a sum of the environmental light acquisition time and a light emission time during which the light emission part emits light for object detection, is constant.

14. A control method of an object detection apparatus comprising:

determining a time of light emission for object detection by a light emission part emitting laser light, which is a duration, in accordance with a characteristic of detection reflection light that is incident light on a light reception part in response to the light emission for object detection by the light emission part;

causing the light reception part to perform a light reception operation by which to acquire environmental light during an environmental light acquisition time, which is a duration, determined by the determined light emission time and an object detection time;

causing the light emission part to perform a light emission operation for object detection during the determined light emission time; and increasing the light emission time and decreasing the environmental light acquisition time if an S/N ratio that is the characteristic of the detection reflection light is lower than a predetermined reference value, wherein the object detection time is constant.

* * * * *